3,413,686
TIRE RETREADING EQUIPMENT
Raymond P. Hawkinson, Minneapolis, Minn., assignor to Paul E. Hawkinson Company, Minneapolis, Minn., a corporation of Minnesota
Filed Nov. 23, 1966, Ser. No. 596,695
3 Claims. (Cl. 18—18)

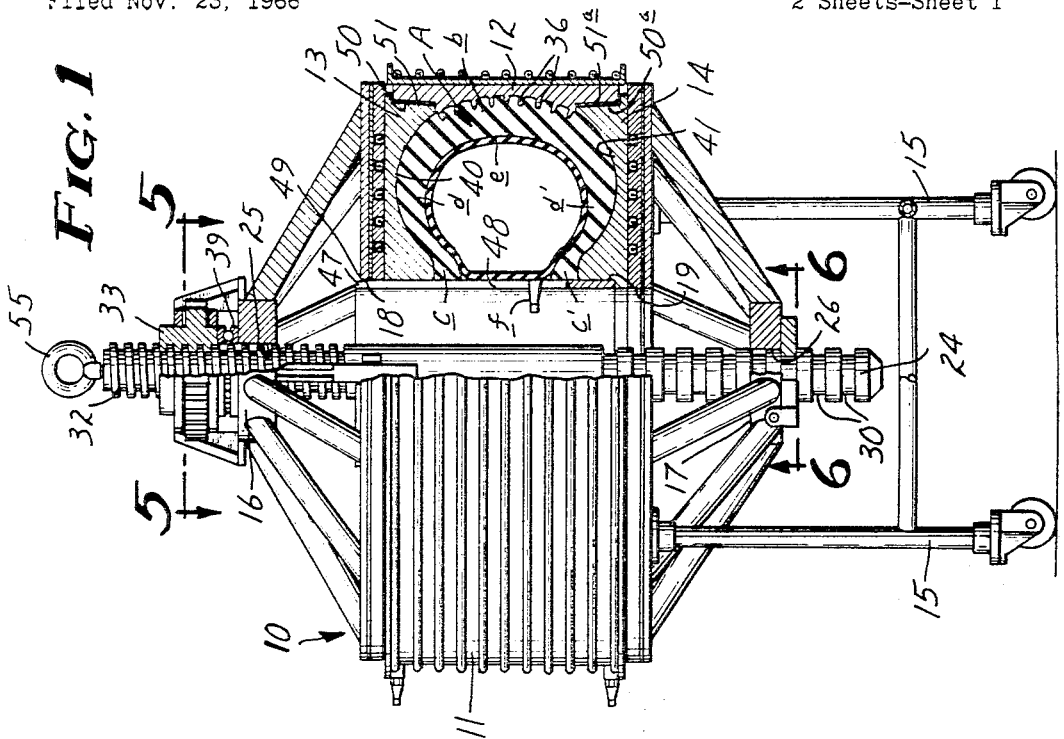

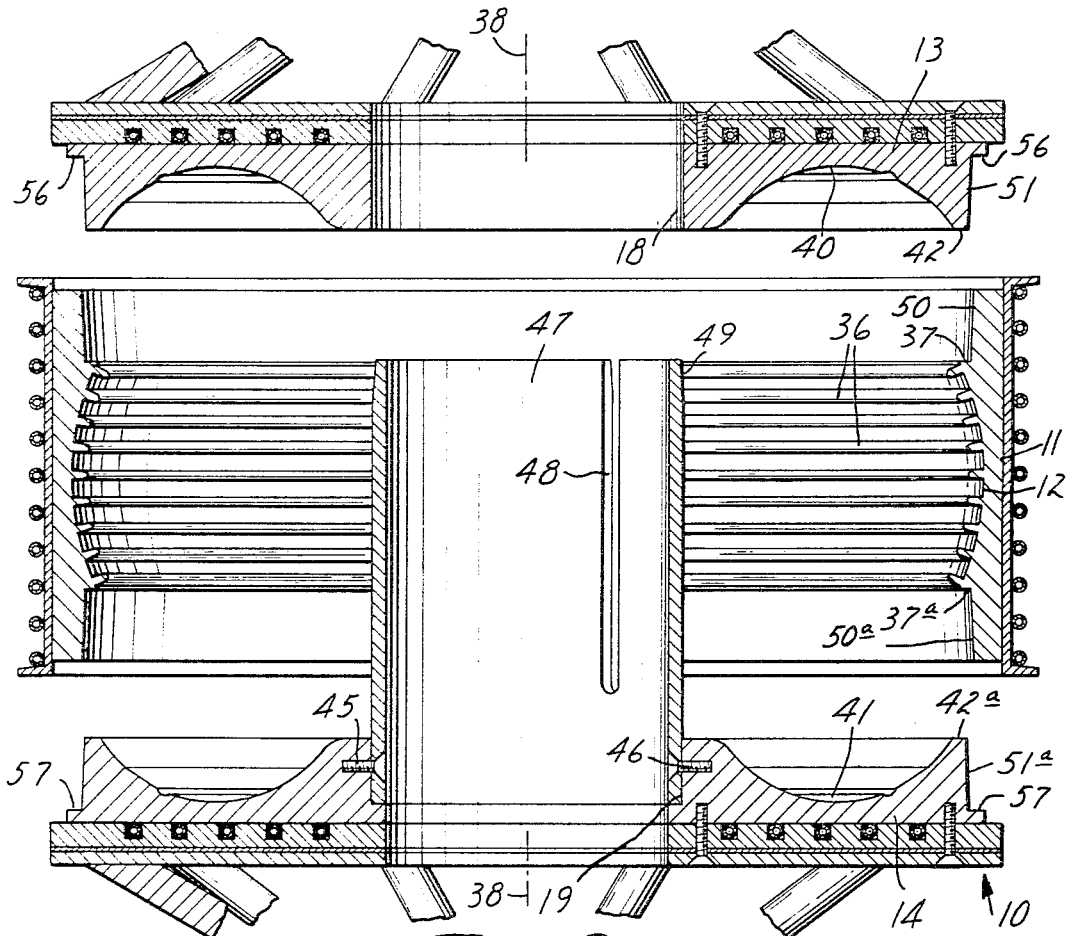
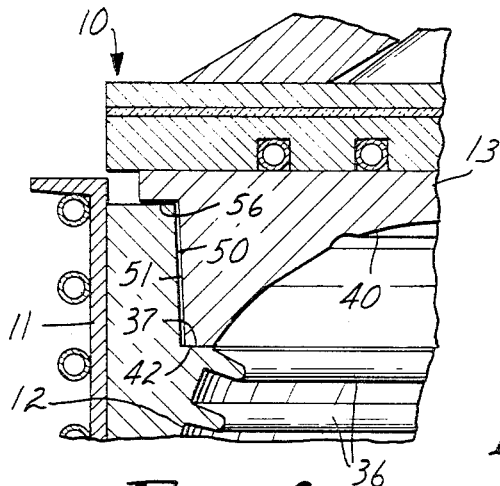
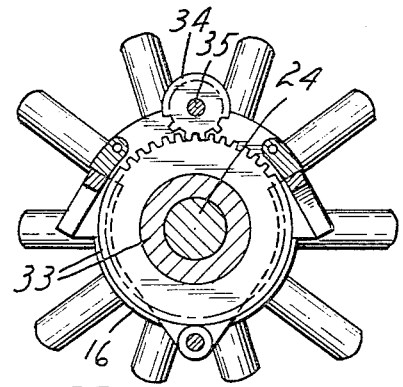
FIG. 3
FIG. 4
FIG. 5
INVENTOR.
RAYMOND P. HAWKINSON
BY Merchant & Gould
ATTORNEYS United States Patent Office 3,413,686
Patented Dec. 3, 1968

ABSTRACT OF THE DISCLOSURE

This application discloses tire retreading equipment of the type used to retread heavy-duty tires. Tires of this type, which are used on earth movers or airplanes for example, often require a retread of the "full cap" type in which the retread may extend completely around the tire from bead to bead. The equipment disclosed herein is capable of retreading a tire from bead to bead. The equipment includes an annular matrix and a pair of oppositely disposed pressure plates that cooperate to form a deep cavity retread mold. An axially positioned clamping device is provided to clamp the two pressure plates tightly against opposite sides of the matrix section, and a cylindrical curing rim is provided that extends through axial openings in the pressure plates, matrix section, and tire.

Background of the invention

*Field of the invention.*—This invention relates to the field of heavy-duty tire retreading equipment, and more particularly relates to an improved assembly wherein the entire outer surface of a tire can be retreaded, and wherein means are provided to quickly and accurately position the pressure plates and matrix section to form an accurate retread mold that will not become misaligned during the molding process.

*Description of the prior art.*—This invention resides in a very crowded field of art, with the basic retreading equipment having been known for many years, and with many improvements having been made on that equipment. For example, the same general type of retread equipment is shown in the Hawkison Patent 2,777,163 that issued Jan. 15, 1957. Other improvements that have been made in this type of apparatus are shown in the Sornsen application Ser. No. 403,580 that was filed Oct. 13, 1964, now Patent No. 3,300,814, and in the Larson application Ser. No. 464,075 that was filed June 15, 1965, now Patent No. 3,315,312, both of these applications having been assigned to the assignee herein. This prior art and the other pertinent prior art of which I am aware, is not capable of retreading the entire outer surface of a tire carcass from bead to bead. Equipment such as that disclosed in the above-mentioned Larson application, for example, will retread the crown portion of the tire and approximately one-half of each of the side walls adjacent the crown portion. This older equipment is not capable of retreading that portion of the side wall adjacent the bead of the tire, however.

Recently, the United States Government has established a requirement that certain of its tires, especially airplane tires, must be retreaded over the entire outer surface from bead to bead. The above described prior art equipment is not capable of performing this function and will not meet government requirements. For that reason, I have designed the equipment disclosed herein such that the entire outer surface of a tire, or any portion thereof, can be retreaded or recapped as required.

A further problem with the above-described prior art equipment was that the side walls of the tire carcass being retreaded were not fully supported during the retreading operation. Since a tube is placed in the tire carcass and inflated during the retreading operation, it is important that support be given to the side walls of the tire. The present invention provides that support.

Another problem with the prior art was that of quickly and accurately aligning the pressure plates with the matrix section. It is imperative that the pressure plates be accurately aligned with the matrix section and that no misalignment occur during the retread operation. Any such misalignment will cause the tire to be misshaped or unbalanced. Various methods have been utilized by the prior art to achieve this correct alignment. In the above described Larson application, for example, a plurality of pins are used that extend through corresponding openings in adjacent sections of the retreading equipment. In the present invention, a new and very accurate means of achieving proper alignment is utilized. The correct parallel alignment of the opposed pressure plates is achieved by clamping a flat surface portion thereon tightly against a corresponding flat surface portion on the center matrix section. Accurate axial alignment of the two pressure plates is assured by using a curing rim that extends through and fits closely within the central openings of the pressure plates.

Summary of the invention

The invention herein includes the structure provided to retread the entire outer surface of a tire carcass, and the new and improved means of aligning the various elements of the assembly.

Brief description of the drawings

FIGURE 1 is a view partially in side elevation and partially in axial section;

FIGURE 2 is a top plan view of the apparatus shown in FIGURE 1;

FIGURE 3 is an enlarged partially exploded view in axial section of the matrix and axially disposed pressure plates with the tire carcass removed therefrom, portions thereof broken away;

FIGURE 4 is an enlarged detailed sectional view taken along line 4—4 of FIGURE 2;

FIGURE 5 is an enlarged horizontal section taken along line 5—5 of FIGURE 1; and FIGURE 6 is a horizontal section as seen from line 6—6 of FIGURE 1.

Description of the preferred embodiment

Referring now to the drawings wherein like characters indicate like parts throughout the several views, the numeral 10 indicates in its entirety a tire retreading apparatus such as is used particularly in the retreading of large tires. Tire retreading apparatus 10 includes an annular matrix section 11 which has a radially inwardly facing surface 12 that is engageable with the crown or tread portion *b* of a tire casing A. Tire casing A includes, in addition to crown portion *b*, a pair of beads *c* and *c'* and a pair of opposite side walls *d* and *d'*. During the curing or retreading process, a tube *e* is placed in tire casing A to provide the necessary outwardly directed pressure. Tube *e* includes a standard stem *f* for inserting air therein under pressure.

A pair of opposed upper and lower pressure plates 13 and 14 are provided, the latter thereof being equipped with legs 15 to support it on a mounting surface such as a floor. Pressure plates 13 and 14 include head portions 16 and 17 that are coaxially positioned with respect to the central openings 18 and 19 in plates 13 and 14 respectively. For the purpose of clamping pressure plates 13 and 14 against matrix section 11, an elongated screw 24 is provided. Screw 24 projects through central openings 18 and 19 in pressure plates 13 and 14 and through axial openings 25 and 26 in head portions 16 and 17.

Screw 24 is provided with means detachably mounting the lower end thereof for major adjustment of screw 24. Such adjustments depend upon the axial dimensions of matrix 11 and tire casing A. Such means is shown as being in the nature of a pair of clamping arms 27 and 28, pivotally mounted on lower head 17 for swinging movements of the intermediate portion thereof toward and away from engagement with a selected one of a plurality of annular grooves 30 in the lower end of screw 24. A latch member 31 extends between the outer ends of arms 27 and 28 to securely lock the intermediate portion of the arms within a selected groove 30, thus preventing axial movement of screw 24. The upper end of screw 24 is provided with screw threads 32 which have threaded engagement with a nut 33. Rotation of nut 33 imparts clamping pressure on head 16 through the medium of a thrust bearing 39 to draw the plates 13 and 14 into engagement with opposite sides of matrix 11, or to release them from such clamping pressure. Rotation in the proper direction is applied to nut 33 by rotating a gear 34, the teeth of which are meshed to corresponding teeth formed in the periphery of nut 33. Rotation is imparted to gear 34 by means of a wrench or other tool applied to the square end 35 of a coaxial shaft securely attached to gear 34.

Referring again to matrix section 11, it can be seen that tread design, groove forming rib elements 36 are formed on the inwardly facing curing surface 12 thereof. Extending outwardly from the top and bottom edges respectively of curing surface 12 are a pair of flat sealing surfaces 37 and 37a that face in opposite directions.

In the preferred embodiment of the invention, sealing surfaces 37 and 37a lie in horizontal planes that extend through and perpendicular to a centrally located axis 38. Matrix section 11 is symetrical with respect to axis 38. Again, in the preferred embodiment, sealing surfaces 37 and 37a thus are annular flat coaxial surfaces that face upwardly and downwardly respectively.

Referring now to opposed annular pressure plates 13 and 14, each is symmetrical with respect to a centrally located axis, which for the sake of simplicity is again called axis 38. As previously mentioned, plates 13 and 14 have axial circular openings 18 and 19 formed therein, each having a diameter equal to the diameter of the axial opening of the tire being cured. Formed in pressure plates 13 and 14 are annular concave faces 40 and 41. Concave faces 40 and 41 are shaped to engage the side wall portion of a tire throughout the full distance from the crown portion to the bead portion thereof.

Extending outwardly from the outer edge of each concave face 40 and 41 is a flat sealing surface, designated as 42 and 42a respectively. Sealing surfaces 42 and 42a are again flat annular surfaces that lie in horizontal planes extending through and perpendicular to axis 38.

Mounted within pressure plate 14 by means of screws 45 and 46 is a cylindrical curing rim 47 having an outside diameter equal to the diameter of axial openings 18 and 19 and equal to the diameter of the central opening in tire A. Curing rim 47 has an elongated slot 48 formed therein parallel to the central axis thereof (again considered to be axis 38) and extending from the top end thereof to a point past the midpoint thereof to accommodate air stem f of tube e. Curing rim 47 has the upper edge or portion thereof beveled as at 49 to facilitate insertion of plate 13 during assembly.

In the preferred embodiment of my invention, matrix section 11 also includes first and second circumferentially disposed inwardly facing surface portions 50 and 50a, the surfaces of which extend upwardly and downwardly respectively from the outer edges of sealing surfaces 37 and 37a respectively. Annular surface portions 50 and 50a are thus also coaxial with respect to axis 38.

Pressure plates 13 and 14 also have circumferentially disposed outwardly facing surface portions 51 and 51a that extend upwardly and downwardly from the outer edges of sealing surfaces 42 and 42a respectively. Again, annular surface portions 51 and 51a are coaxial with respect to axis 38.

Operation

When it is desired to retread a tire casing in the apparatus disclosed herein, the apparatus is first disassembled as follows. Clamping arms 27 and 28 are first released and swung outwardly to release screw 24 from head 17. To permit release of clamping arms 27 and 28, it is usually first necessary to back off nut 33 to release the clamping pressure on the assembly. After clamping arms 27 and 28 are released from their engagement with groove 30, a hoist or other mechanism (not shown) is attached to a ring 55 carried by screw 24. The upper portion of the assembly, including head 16 and pressure plate 13, can thus be lifted away from the remainder of the assembly.

After pressure plate 13 is removed, matrix section 11 and tire A are lifted upwardly and away from curing rim 47. Tire A can then be removed from matrix section 11. At this point in the disassembly of the apparatus bottom pressure plate 14 with curing rim 47 attached thereto remains standing on legs 15. When it is desired to retread another tire casing, the casing together with new tread is first placed within matrix section 11. A tube is placed within the tire. Matrix section 11, tire A, and tube e are then inserted over curing rim 47 with air stem f sliding downwardly through elongated slot 48. Pressure plate 13 is then inserted over curing rim 47 as shown in FIGURE 1 and the necessary clamping pressure applied.

Accurate alignment of the deep cavity retread mold formed as above described is accomplished as follows. Pressure plates 13 and 14 are held in coaxial alignment by means of curing rim 47. Since the outside diameter of curing rim 47 is equal to the inside diameter of axial openings 18 and 19, pressure plates 13 and 14 are securely held from any lateral movement.

Accurate parallel alignment of pressure plates 13 and 14 is established by clamping sealing surface 42 against sealing surface 37 and by clamping sealing surface 42a against sealing surface 37a.

As shown in the drawing, the outwardly facing surface portions 51 and 51a of pressure plates 13 and 14 respectively are nestably received by the inwardly facing surface portions 50 and 50a of matrix section 11. To assure that the previously mentioned adjoining sealing surfaces can be tightly joined without any interference caused by a binding of joining surface portions, surface portion 51 is spaced a predetermined distance from surface portion 50, and surface portion 51a is spaced the same predetermined distance from surface portion 50a. The same spacing is provided between an overhanging lip surface 56 of plate 13 and matrix section 11, and between a similar overhanging lip surface 57 of plate 14 and matrix section 11. This spacing of the various surfaces is perhaps most clearly shown in FIGURE 4. The pressure plates 13 and 14 and the curing rim 47 thus cooperate to provide correct axial alignment of the apparatus while the adjoining sealing surfaces 42–37 and 42a–37a assure correct lateral alignment. After the tire retreading apparatus 10 is completely assembled and clamping pressure applied, it may be moved by means of legs 15 or by means of ring 55 without disturbing the retread mold.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

I claim:

1. In a device of the class described, the combination comprising:

(a) an annular matrix section that is symmetrical with respect to a centrally located axis, said matrix section including:
- (1) an inwardly facing curing surface having top and bottom edges, said curing surface being engageable with the crown portion of a tire casing; and
- (2) a pair of flat sealing surfaces facing in opposite directions and extending outwardly from the top and bottom edges, respectively, of said curing surface;

(b) a pair of opposed annular pressure plates each of which is symmetrical with respect to a centrally located axis and each of which has an axial circular opening therein with a diameter equal to the diameter of the axial opening of the tire being cured, each of said pressure plates including:
- (1) an annular concave face formed therein to engage the side wall portion of a tire throughout the full distance from the crown portion to the bead portion thereof; and
- (2) a flat sealing surface extending outwardly from the outer edge of said concave face;

(c) means for mounting said pressure plates on opposite sides of said matrix section and coaxially therewith to form a deep cavity retread mold, said sealing surface on each of said pressure plates lying adjacent to and being held by said mounting means in a sealing relationship with said associated sealing surface of said matrix section;

(d) a cylindrical curing rim having an outside diameter equal to the diameter of said axial openings, said curing rim being inserted into said axial openings to prevent inward expansion of the tube of said tire when inflated, said curing rim further cooperating with said pressure plates to hold said pressure plates in coaxial alignment; and (e) means securely attached to one of said pressure plates to hold said plate a fixed distance above a mounting surface with said centrally located axis being held in a vertical position; and (f) means for securing said cylindrical curing rim within the axial opening of and to said one pressure plate, said curing rim thereby extending vertically upwardly to facilitate the successive coaxial insertion thereon of said matrix section and said other pressure plate.

2. The apparatus of claim 1 including:
- (a) first and second circumferentially disposed inwardly facing surface portions extending upwardly and downwardly respectively from the outer edges of said pair of sealing surfaces of said matrix section; and
- (b) a circumferentially disposed outwardly facing surface portion extending from the outer edge of said sealing surface on each of said pressure plates, said outwardly facing surface portions of said pressure plates being nestably received by said inwardly facing surface portions of said matrix section, said outwardly facing surface portion of each of said pressure plates being spaced a predetermined distance from said adjoining surface portion of said matrix section so that said sealing surfaces can be tightly joined to establish accurate parallel alignment of said pressure plates without interference caused by a binding of said adjoining surface portions.

3. The apparatus of claim 1 wherein said means for mounting said pressure plates on opposite sides of said matrix section include:
- (a) each pressure plate having a head portion thereon extending outwardly therefrom;
- (b) an elongated screw extending through each of said head portions and the axial openings in said pressure plates;
- (c) means detachably mounting one end of said screw in one head portion for major adjustments thereof; and
- (d) means associated with the other end of said screw and other head portion for applying clamping pressure to said pressure plates.

References Cited
UNITED STATES PATENTS

| | | |
|---|---|---|
| 2,313,414 | 3/1943 | Wheatley. |
| 2,418,584 | 4/1947 | Hawkinson. |
| 2,422,788 | 6/1947 | Kraft. |
| 2,745,137 | 5/1956 | Glynn. |
| 2,777,163 | 1/1957 | Hawkinson. |
| 2,834,984 | 5/1958 | Robbins. |
| 3,277,532 | 10/1966 | Hutchinson. |
| 3,300,814 | 1/1967 | Sornsen. |
| 3,315,312 | 4/1967 | Larson. |

J. HOWARD FLINT, JR., *Primary Examiner.*